(12) United States Patent
Jefferies et al.

(10) Patent No.: US 11,843,704 B2
(45) Date of Patent: *Dec. 12, 2023

(54) ENSURING DATA CONSISTENCY BETWEEN A MODULAR DEVICE AND AN EXTERNAL SYSTEM

(71) Applicant: Schneider Electric USA, Inc., Andover, MA (US)

(72) Inventors: Kevin M. Jefferies, Raleigh, NC (US); Daniel Martin, Apex, NC (US); Surya Narayana H Govindaraju, Bengaluru (IN); Juergen Fiess, Lahr (DE); Christian Ringwald, Ettenheim (DE); Wolfgang Fien, Kehl (DE)

(73) Assignee: Schneider Electric USA, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/852,361

(22) Filed: Jun. 29, 2022

(65) Prior Publication Data

US 2022/0329440 A1 Oct. 13, 2022

Related U.S. Application Data

(63) Continuation of application No. 16/919,502, filed on Jul. 2, 2020, now Pat. No. 11,405,217.
(Continued)

(51) Int. Cl.
*H04L 41/0853* (2022.01)
*H04L 41/0869* (2022.01)
(Continued)

(52) U.S. Cl.
CPC .......... *H04L 9/3247* (2013.01); *H04L 9/0643* (2013.01); *H04L 41/0853* (2013.01); *H04L 41/0856* (2013.01); *H04L 41/0869* (2013.01)

(58) Field of Classification Search
CPC . H04L 9/3247; H04L 9/0643; H04L 41/0853; H04L 41/0856; H04L 41/0869;
(Continued)

(56) References Cited

U.S. PATENT DOCUMENTS 10,838,386 B1 * 11/2020 Wrobel ............... G05B 19/058
10,896,266 B1   1/2021 BeSerra et al.
(Continued)

FOREIGN PATENT DOCUMENTS

AU    2017228729 A1 * 10/2017 ............ G06F 11/008
EP        2757498 A1 *  7/2014 ............ G06F 21/57
(Continued)

OTHER PUBLICATIONS

EP Extended Search Report for European Patent Application No. 20183736.6 dated May 3, 2022.
(Continued)

*Primary Examiner* — Alina A Boutah
(74) *Attorney, Agent, or Firm* — Locke Lord LLP

(57) ABSTRACT

The present application relates to ensuring data consistency between a modular device and an external system. Techniques are described for ensuring data consistency between devices at a control device using configuration signatures. A control device can receive and store a baseline configuration signature for a first modular device. Upon initialization of the first modular device, the control device can receive a current configuration signature from the first modular device. The control device can compare the current configuration signature with the baseline configuration signature and, if a mismatch is found, generate a notification indicating that data subsequently received from the first modular device is of uncertain integrity.

20 Claims, 5 Drawing Sheets

Related U.S. Application Data

(60) Provisional application No. 62/869,938, filed on Jul. 2, 2019.

(51) Int. Cl.
*H04L 9/32* (2006.01)
*H04L 9/06* (2006.01)

(58) Field of Classification Search
CPC ........ G06F 21/57; G06F 9/4451; G06F 21/44; G06F 16/2365; G05B 19/0425
See application file for complete search history.

(56) References Cited

U.S. PATENT DOCUMENTS

| | | |
|---|---|---|
| 2009/0260082 A1 | 10/2009 | Rissa |
| 2014/0189362 A1 | 7/2014 | Van Den Broeck et al. |
| 2014/0280846 A1 | 9/2014 | Gourlay et al. |
| 2016/0179556 A1 | 6/2016 | McGowan |
| 2017/0075345 A1 | 3/2017 | Fisher et al. |
| 2017/0141924 A1 | 5/2017 | Ryu et al. |
| 2017/0295063 A1 * | 10/2017 | Yang ...................... H04L 41/12 |
| 2018/0136943 A1 | 5/2018 | Chew et al. |
| 2018/0137303 A1 | 5/2018 | Farkash et al. |
| 2020/0151972 A1 | 5/2020 | Nakajima et al. |
| 2021/0081536 A1 | 3/2021 | Zhang et al. |

FOREIGN PATENT DOCUMENTS

| | | | | |
|---|---|---|---|---|
| WO | WO-0223875 A1 * | 3/2002 | ......... | H04L 41/0226 |
| WO | WO-2015181925 A1 * | 12/2015 | ............. | G06F 21/44 |

OTHER PUBLICATIONS

Casper Yang, "A better protocol conversion solution between PLC's and devices", Process Control & Automation, Jun. 8, 2016 (Year: 2016).

* cited by examiner

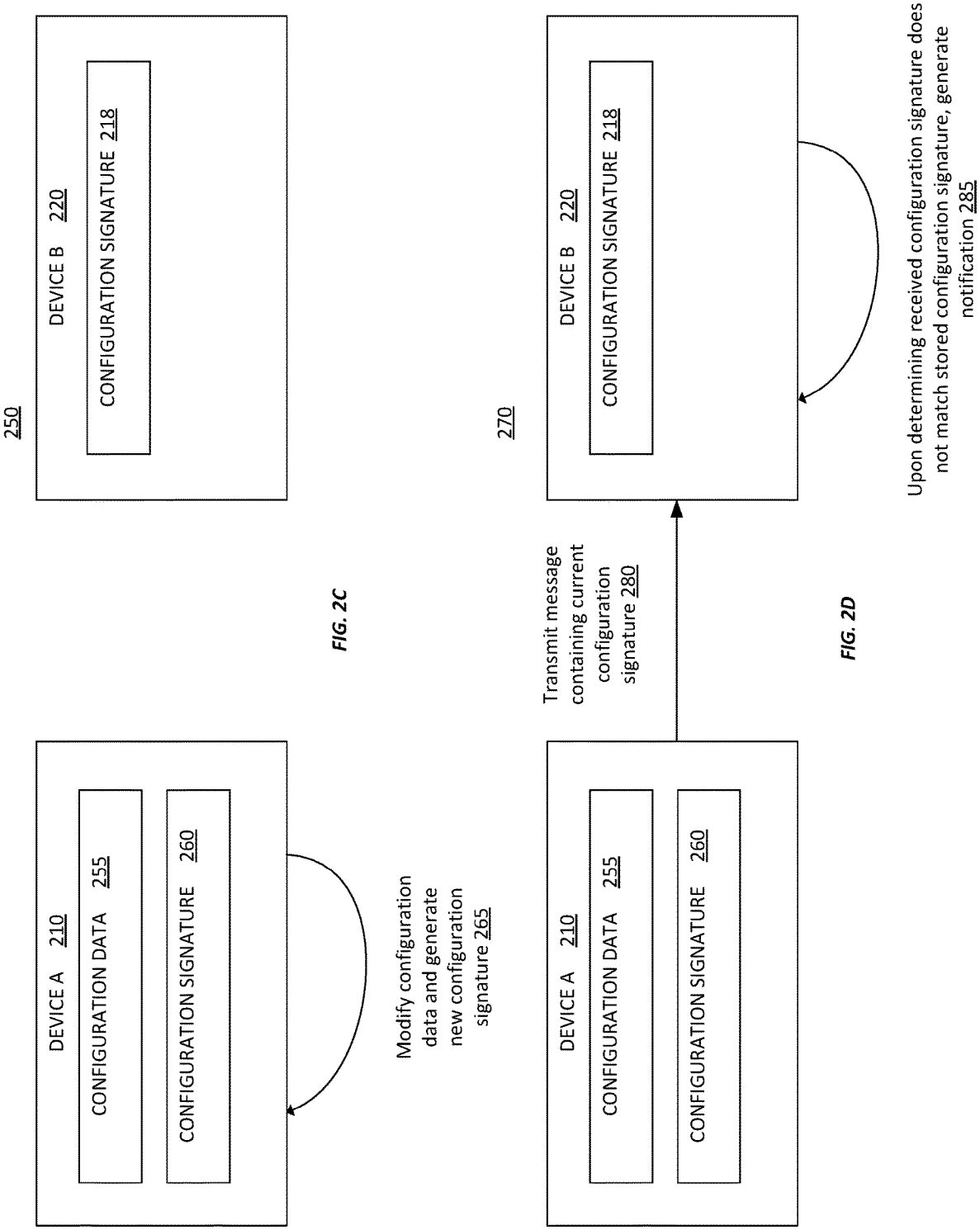

ENSURING DATA CONSISTENCY BETWEEN A MODULAR DEVICE AND AN EXTERNAL SYSTEM

CROSS-REFERENCE TO RELATED APPLICATIONS

This application for patent is a continuation of U.S. Non-Provisional application Ser. No. 16/919,502, entitled "Ensuring Data Consistency Between a Modular Device and an External System," filed Jul. 2, 2020, which claims the benefit of priority to U.S. Provisional Application No. 62/869,938, entitled "Ensuring Data Consistency Between a Modular Device and an External System," filed Jul. 2, 2019, the foregoing applications being incorporated herein by reference.

TECHNICAL FIELD

The present disclosure relates to device communications, and more specifically to communication techniques for detecting and accounting for configuration changes in a modular device to ensure data consistency between the modular device and an external system.

BACKGROUND

Industry today utilizes the electric motor to perform a wide array of tasks. Generally, various types of motors may be used depending on the particular application. Electric motors may be utilized for fixed speed, variable speed, and/or positional control of various types of industrial equipment. In most industrial applications a motor controller is utilized along with the motor itself to form a motor control system. Motor controllers may include logic and hardware for starting and stopping a motor, selecting the motor rotation, selecting and regulating the speed, regulating or limiting the torque, and/or various protection functions such as overloads and/or faults. Frequently, a number of other devices may be used alongside such electric motors in industrial applications (e.g., sensor devices, application-specific devices, and so on), adding complexity to the device communications for the system. Additionally, such devices may be modular devices, which are capable of various configurations and may operate in a different manner depending on their configuration. While a modular device can offer additional flexibility and functionality, other devices in the industrial system may need to be configured to account for the current configuration of the modular device. When the configuration of the modular device changes, these other devices may need to be reconfigured to reflect the new configuration of the modular device, as otherwise the system may not perform as intended and may result in erroneous behavior and/or system downtime. These difficulties are exacerbated in environments where, due to business reasons, downtime and other interruptions needs to be minimized.

SUMMARY

One embodiment described herein provides a method for ensuring data consistency between devices at a control device using configuration signatures. The method includes receiving and storing a baseline configuration signature for a first modular device. The method also includes receiving, upon initialization of the first modular device, a current configuration signature from the first modular device. The method further includes comparing the current configuration signature with the baseline configuration signature and, if a mismatch is found, generating a notification and halting one or more processing operations related to the first modular device.

Another embodiment described herein provides a method for ensuring data consistency between devices at a modular device using configuration signatures. The method includes upon initialization of the first modular device, generating a current configuration signature using current data values for the predefined set of configuration parameters. The method also includes receiving a baseline configuration signature from a control device, wherein the baseline configuration signature was provided to the control device by a configuration application when the first modular device was configured. Additionally, the method includes comparing the received baseline configuration signature with the generated current configuration signature. The method further includes, upon determining the current configuration signature and the received baseline configuration signature do not match, generating a notification and halting one or more processing operations for the first modular device.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIGS. 2A-D are block diagrams illustrating a workflow for ensuring data consistency between devices using configuration signatures, according to one embodiment described herein.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
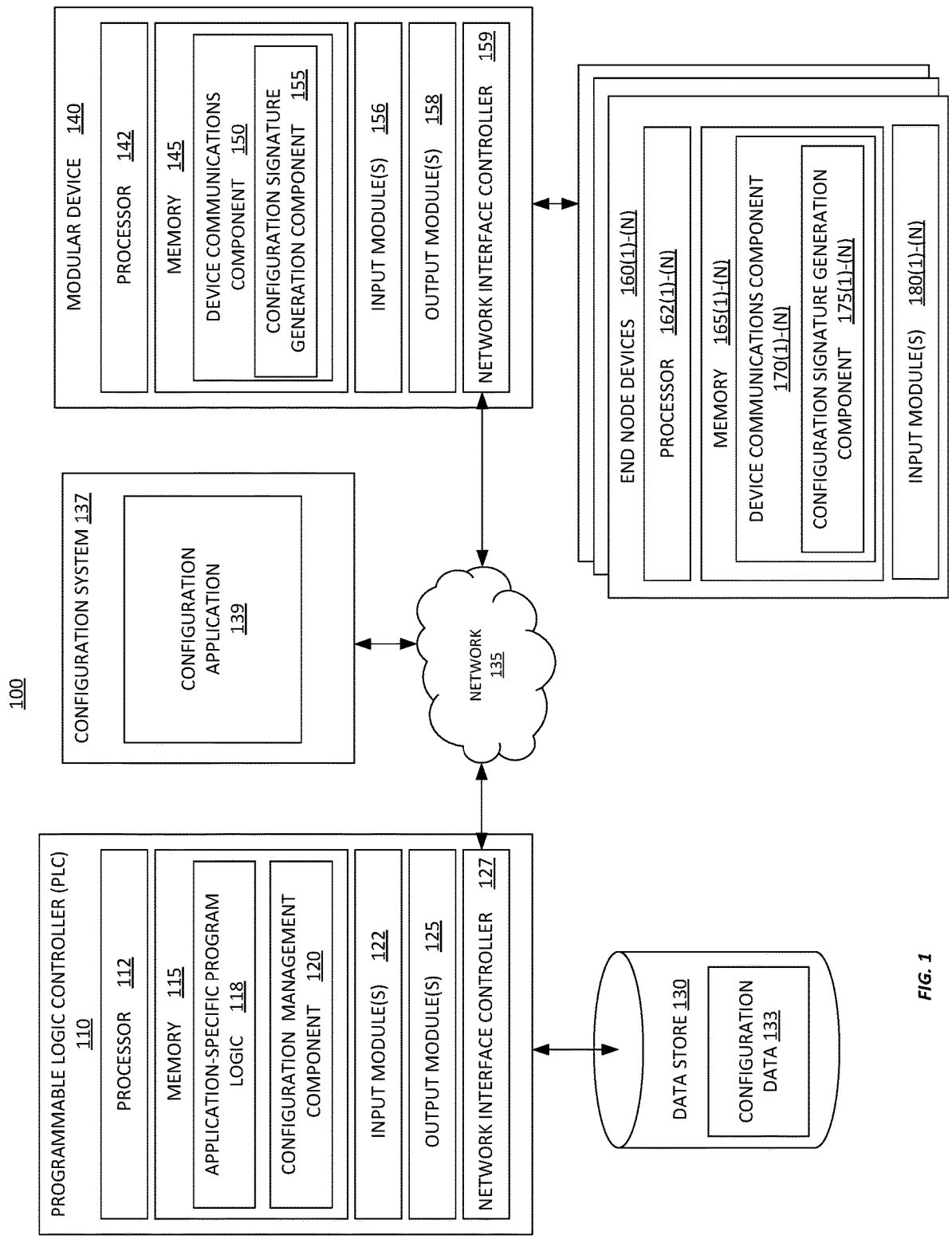
FIG. 1 is a block diagram illustrating a system configured with a configuration management component, according to one embodiment described herein.

FIG. 1 is a block diagram illustrating a system configured with a configuration management component, according to one embodiment described herein. As shown, the system 100 includes a Programmable Logic Controller (PLC) 110, a configuration system 137 and a modular device 140, interconnected via a network 135. Generally, the network 135 represents any suitable data communications network, with examples including (without limitation) a local area network (LAN), a wide area network (WAN), an IEEE 802.11 wireless network, and so on.

The PLC 110 includes one or more computer processors 112, a memory 115, an input module(s) 122, an output module(s) 125, and a network interface controller 127. Generally, the input module(s) 122 represent devices that provide inputs to the PLC 110. Such inputs may be provided, for example, in the form of digital inputs or analog signals. In the case of analog signals, the input module(s) 122 can include circuitry for converting the analog signals into logic signals that can be processed by the processor 112. The output module(s) 125 generally convert logic signals from the processor 112 into digital or analog values for use in controlling output devices. The memory 115 contains application-specific program logic 118 and a device configuration server component 120. Generally, the application-specific program logic 118 represents software logic that performs various application-specific operations, depending on the type of the computing environment 100. For example, a PLC device 110 within an industrial automation environment may perform different application-specific operations than a PLC device 110 within a fulfillment center environment.

The modular device 140 includes a computer processor 142, a memory 145, an input module(s) 156, an output module(s) 158, and a network interface controller 159. Generally, the input module(s) 156 represent devices that provide inputs to the modular device 140. Such inputs may be provided in the form of digital inputs or analog signals, for example. For the latter, the input module(s) 156 can include circuitry for converting the analog signals into logic signals that can be processed by the processor 142. The output module(s) 158 generally convert logic signals from the processor 142 into digital or analog values for outputting to output devices. The network interface controller 159, like the network interface controller 127, facilitates communication with the network 135.

One or more end node devices 160(1)-(N) may also be present in the system 100. Each end node device 160(1)-(N) includes, respectively, a computer processor 162(1)-(N), a memory 165(1)-(N), and an input module(s) 180(1)-(N). The input module(s) 180(1)-(N) represent devices that provide inputs to their respective end node devices 160(1)-(N) in a manner similar to their counterpart input modules in the PLC 110 and modular device 140.

Any general-purpose computer systems used in various embodiments of this disclosure may be, for example, general-purpose computers with general-purpose computer processors. For example, the processors 112, 142 and 162(1)-(N) may include processors based on Intel PENTIUM-type processor, Motorola PowerPC, Sun UltraSPARC, Hewlett-Packard PA-RISC processors, or any other type of processor. Generally, the processors 112, 142 and 162(1)-(N) represent any suitable processor(s), including commercially available processors such as the well-known Pentium class processor available from the Intel Corporation. Many other processors are available. Such a processor usually executes an operating system (not shown) which may be, for example and without limitation, Microsoft® Windows®, Apple® macOS®, Solaris®, UNIX®, or Linux®. Many other operating systems may be used.

The memories 115, 145 and 165(1)-(N) generally represents any suitable form of addressable computer memory. For example, the memories 115, 145 and 165(1)-(N) may represent a volatile memory (e.g., static random-access memory (SRAM)) and/or a non-volatile memory (e.g., Flash memory). More generally, any suitable form of memory device(s) can be used, consistent with the functionality described herein. Generally, the processor and operating system together define a computer platform for which application programs in high-level programming languages are written. It should be understood that embodiments of the present disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

As shown, the memory 115 contains application-specific program logic 118 and a configuration management component 120. The memory 145 contains a device communications component 150, which in turn contains a configuration signature generation component 155. Furthermore, the memories 165(1)-(N) each contain a respective device communications component 170(1)-(N), which in turn contain configuration signature generation components 175(1)-(N). The PLC 110 is communicatively coupled to a data store 130, which in the depicted embodiment contains configuration data 133.

In the depicted example, the configuration system 137 includes a configuration application 139. Generally, the configuration application 139 can be used to configure the modular device 140 and/or end node devices 160(1)-(N). For example, the configuration application 139 could provide a human-machine interface (HMI) through which an administrator can generate a configuration profile for one or more of the devices 140 and 160(1)-(N). The configuration application 139 could then deploy the generated configuration profile onto the one or more devices. When doing so, the configuration application could identify a plurality of predetermined configuration parameters and can generate a configuration signature from data values in the initial configuration for the plurality of predetermined configuration parameters. In one embodiment, the configuration application 139 is configured to use a hash function on the data values for the plurality of predetermined configuration parameters to generate the configuration signature (e.g., a 256-bit hash value).

Generally, the plurality of predetermined configuration parameters includes configuration parameters that can impact the operation of the modular device when interacting with the PLC 110. For example, a first parameter could be included in the plurality of configuration parameters if its data value can impact an operation performed between the PLC 110 and the modular device 140, while a second parameter could be excluded if it would affect the performance of the modular device 140 but would not impact the operation performed between the PLC 110 and the modular device 140.

In a particular embodiment, the plurality of predetermined configuration parameters define a communication protocol for implicit communications between the PLC 110 and the modular device 140. For example, the modular device 140 may be configured to periodically transmit a plurality of data values, of various data types, of various sizes, and in a particular order to the PLC 110, and such a configuration can be defined in configuration data stored on the modular device 140. Likewise, the PLC 110 may be configured with configuration data that defines the attributes of incoming data message and, based on this configuration data, the PLC 110 may expect transmissions from the modular device 140 to contain data for the ordered sequence of data types and may expect each data type to have the specified size, and so on.

One advantage to such implicit communications protocols is that there is less overhead to the communications between the PLC 110 and the modular device 140 relative to alternative communication protocols. For example, by agreeing on the ordering of data values of defined types and sizes ahead of time and defining this in the configuration data, the modular device 140 is able to transmit data values to the PLC 110 (or vice versa) without any embedded tags (e.g., that define the type of the data values and delimit the individual data values). While such a communications protocol offers many advantages, the protocol may break down if either the modular device 140 and/or the PLC 110 unilaterally make changes to their configuration data without coordinating with each other. That is, if the modular device 140 changes the size of the first data value the modular device 140 is sending to the PLC 110 from 8 bytes to 16 bytes, but the PLC 110 still expects the first data value to be an 8-byte value, the PLC 110 may misinterpret the message received from the modular device. As such, embodiments described herein can generate configuration signatures by hashing the configuration data that defines the implicit communications protocol between the PLC 110 and modular device 140 and can compare these configuration signatures over time to ensure the communications protocol is still being followed by both devices.

The configuration management component 120 can receive the generated configuration signature from the configuration application 139 (e.g., using the network 135) and could store the signature in the configuration data 133 of the data store 130. Upon subsequent initialization of the modular device 140 (e.g., after the device is restarted), the device communications component 150 of the modular device 140 could provide an updated configuration signature to the configuration management component 120 of the PLC 110. For example, the configuration signature generation component 155 could retrieve current data values for the plurality of predetermined configuration parameters and could generate the configuration signature (e.g., a 256-bit hash value) using the current data values.

Upon receiving the updated configuration signature, the configuration management component 120 could compare the updated configuration signature with the previously stored configuration signature in the data store 130. If the signatures match, the configuration management component 120 could determine that the data coming from the modular device 140 has integrity and take no further action at this time. On the other hand, if the configuration management component 120 determines that the signatures do not match, the configuration management component 120 could generate a notification (e.g., to alert a user of the issue) and could halt one or more data processing operations relating to the modular device 140. In one embodiment, the configuration management component 120 can any flag data received from the modular device 140 subsequent to the signature mismatch to indicate the data is of uncertain integrity.

Of note, although in the aforementioned example the comparison is performed by the configuration management component 120, in an alternate embodiment the configuration management component 120 could transmit the previously stored signature to the modular device 140 upon initialization of the modular device 140, and the device communications component 150 can compare the signatures to determine whether a mismatch exists. Moreover, while the aforementioned example involves the device communications component 150 and configuration signature generation component 155, it is contemplated that the same functionality can be performed by the device communications components 170(1)-(N) and configuration signature generation components 175(1)-(N). For example, the configuration signature generation component 175(1), upon initial configuration of the end node device 160(1), could generate a baseline configuration signature and could transmit this baseline configuration signature to the PLC 110 for storage in the data store 130. The PLC 110 can then perform comparison operations between the baseline configuration signature and subsequently generated configuration signatures received from the end node device 160(1) to determine whether the configuration of the end node device 160(1) has changed (and, e.g., if so, could generate a notification and halt one or more processing operations with the end node device 160(1)).

Figure 2A:
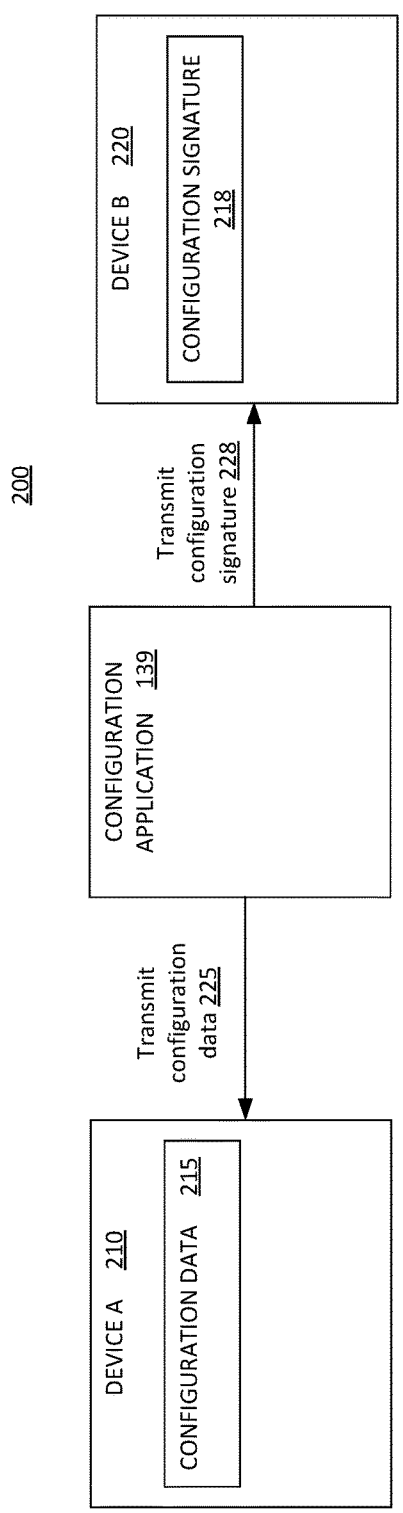

FIGS. 2A-D are block diagrams illustrating a workflow for ensuring data consistency between devices using configuration signatures, according to one embodiment described herein. As shown, FIG. 2A shows a system 200 that includes device A 210, configuration application 139 and a device B 220. For example, the device A 210 could be a modular device in an industrial automation environment and the device B 220 could be a controller device in the industrial automation environment. More generally, however, it is contemplated that the communication techniques described herein could be applied by a variety of different devices.

In the depicted embodiment, the configuration application 139 has generated and transmits configuration data 215 to device A 210 (operation 225) and has generated and transmits a configuration signature 218 for the configuration data to device B (operation 228). Generally, the configuration data 215 represents data storing information on configuration settings for the device A 210. These configuration settings could be physical configurations for the device A 210 (e.g., data describing the state of a physical switch), configuration values from a configuration file or database, etc. In the depicted embodiment, the configuration application 139 has generated the configuration signature 218 using data values from the configuration data 215 for a plurality of predetermined configuration settings. The plurality of predetermined configuration settings can be selected based on the configuration settings that impact (directly or indirectly) the contents of messages transmitted between the device A 210 and device B 220. That is, the device B 220 may only be concerned with changes to configuration settings that affect the operation of the device B 220, and thus data values for configuration settings that do not impact device B 220 and messages sent between device A 210 and device B 220 may be omitted from the configuration signature 218. In the depicted embodiment, upon generating the configuration signature 218, the configuration application 139 transmits the configuration signature 218 to the device B 220.

Figure 2B:
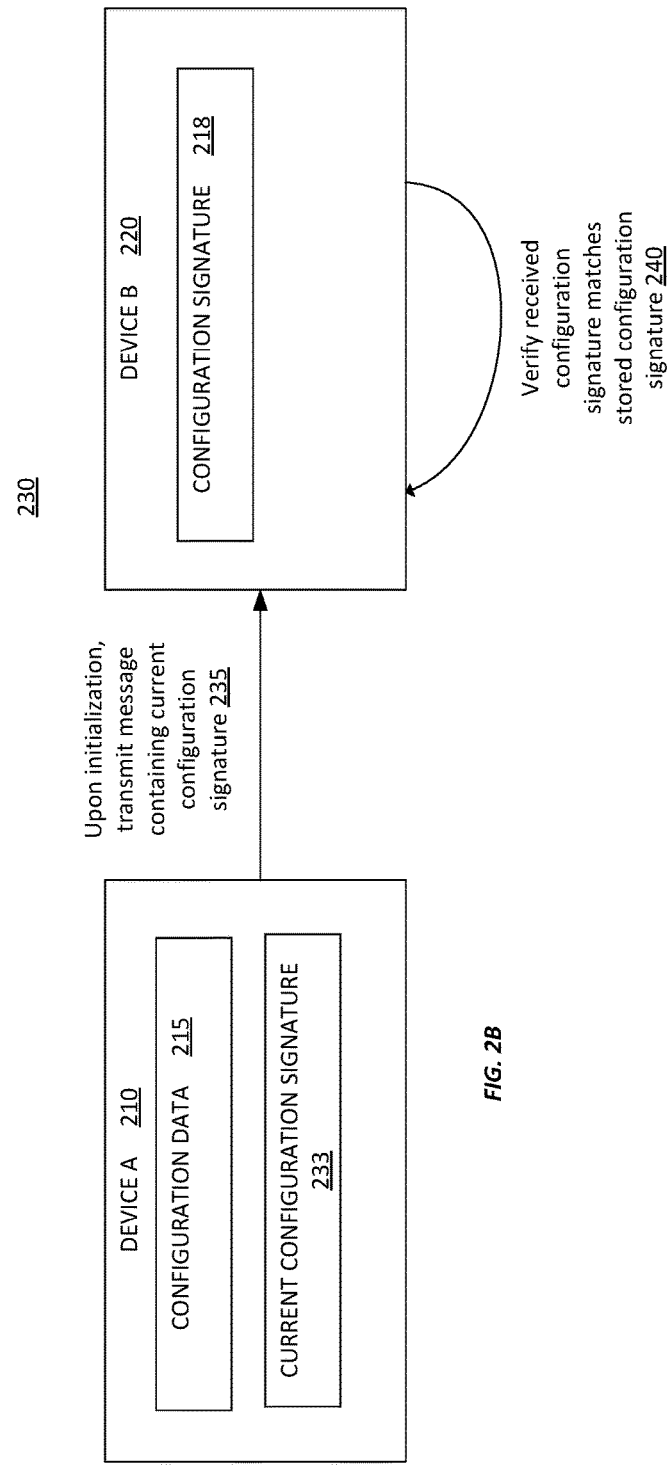

FIG. 2B depicts a system 230, which illustrates the devices 210 and 220 are at a subsequent point in time. More specifically, the system 230 depicts a moment in time when device A 210 has completed initialization (e.g., when the device A 210 has finished booting up after a restart). In the depicted embodiment, the configuration signature generation component 155 on the device A 210, upon initialization, generates a current configuration signature 233 from the configuration data 215 and transmits this signature to the device B 220 (operation 235). Upon receiving the configuration signature, a configuration management component 220 on the device B compares the received configuration signature with the previously stored configuration signatures and verifies that these configuration signatures match (operation 240). That is, because the configuration signatures are generated using data values for configuration settings that can impact the device B 220 and/or the communications between device A 210 and device B 220, the configuration management component 120 can determine whether the configuration of the device A 210 has changed in a meaningful way (i.e., in a way that affects the operation of device B and/or the communications between device A 210 and device B 220) by comparing the configuration signatures.

FIG. 2C illustrates a system 250, in which the configuration of device A 210 has been modified (e.g., by an administrator of the device A 210, due to a hardware failure, etc.). In the depicted example, the configuration signature generation component 155 on the device A 210 generates a new configuration signature 260 based on the updated configuration data 255 (operation 265). In the system 270 shown in FIG. 2D, the device communications component 150 on the device A 210 transmits a message containing the updated configuration signature to the device B (operation 280). The device management component 120 on the device B 220 compares the received signature with the previously stored configuration signature and upon determining that the signatures do not match (i.e., because one or more data values for the plurality of predefined configuration settings on device A has changed in the configuration data 255), the device management component 120 generates a notification to alert a user to the configuration mismatch (operation 285). Additionally, the device management component 120 can take one or more remedial actions responsive to the configuration signatures not matching, such as halting operations between the device A 210 and device B 220, flagging data received from the device A 210 after the configuration mismatch as of questionable integrity, and so on.

Figure 3:
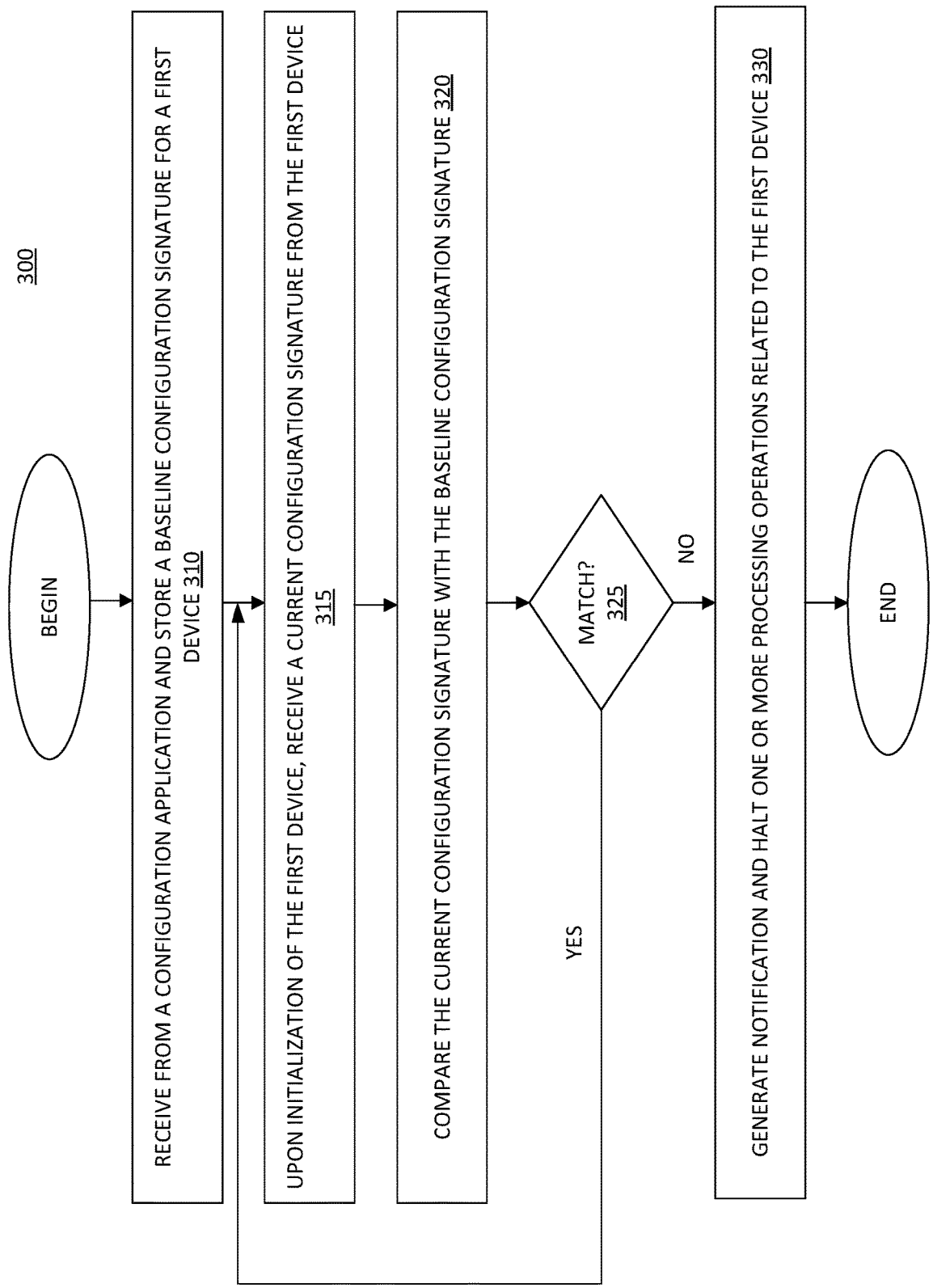
FIG. 3 illustrates a workflow for ensuring data consistency between devices at a control device using configuration signatures, according to one embodiment described herein.

FIG. 3 illustrates a workflow for ensuring data consistency between devices at a control device using configuration signatures, according to one embodiment described herein. As shown, the method 300 begins at block 310, where the configuration management component 120 receives and stores a baseline configuration signature for a first device. For example, the baseline configuration signature could be generated upon the initial configuration of the first device. At a subsequent point in time, upon initialization of the first device (e.g., after a restart operation), the configuration management component 120 receives a current configuration signature from the first device (block 315). The configuration management component 120 compares the current configuration signature with the baseline configuration signature (block 320) and if the signatures match (YES, at block 325), the method 300 returns to block 315. On the other hand, if the configuration management component 120 determines the signatures do not match (NO, at block 325), the configuration management component 120 generates a notification and halts one or more processing operations related to the first device (block 330), and the method 300 ends.

Figure 4:
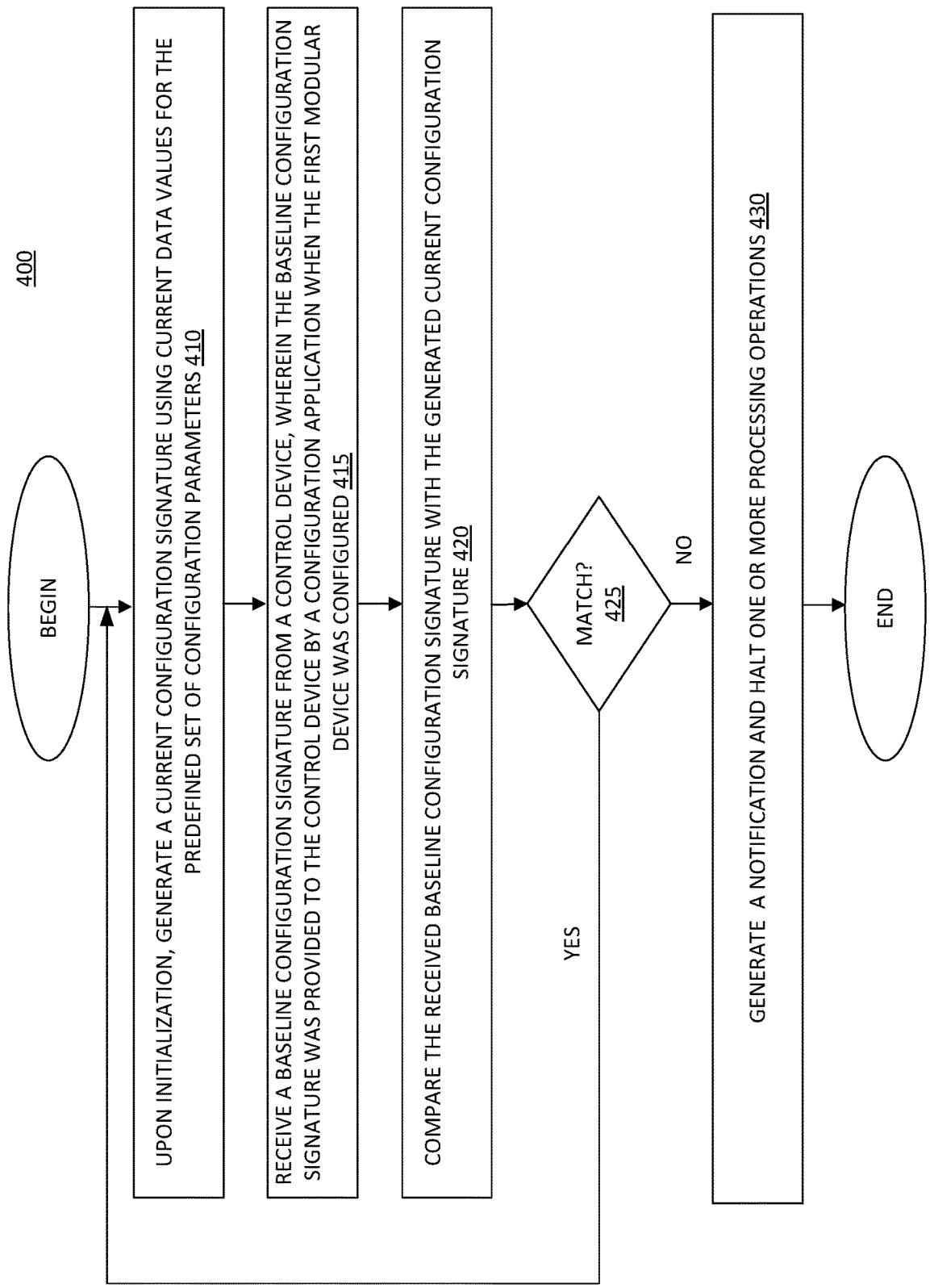
FIG. 4 illustrates a workflow for ensuring data consistency between devices at a modular device using configuration signatures, according to one embodiment described herein.

FIG. 4 illustrates a workflow for ensuring data consistency between devices at a modular device using configuration signatures, according to one embodiment described herein. As shown, the method 400 begins at block 410, where upon initialization of the first modular device, the configuration signature generation component 155 generates a current configuration signature using current data values for the predefined set of configuration parameters. Generally, if the data values for the predefined set of configuration parameters have not changed, the current configuration signature will be identical to the baseline configuration signature previously stored on the control device (e.g., after the control device receives the baseline configuration signature from the control application). On the other hand, if one or more of the data values has been modified, then the configuration signatures will not match.

The configuration signature generation component 155 receives a baseline configuration signature from the control device, where the baseline configuration signature was provided to the control device by a configuration application (block 415). For example, upon configuring the first modular device, the configuration application 139 could generate the baseline configuration signature and the configuration application 139 could provide the baseline configuration signature to the control device for storage. In the depicted embodiment, the first modular device compares the received baseline configuration signature with the generated current configuration signature (block 420) and determines whether the signatures match (block 425). If the signatures do match, the method 400 returns to block 410. On the other hand, if the device communications component 150 of the modular device determines the signatures do not match, the device communications component 150 generates a notification and halts one or more processing operations on the first modular device (block 430), and the method 400 ends.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense.

The scope of the disclosure should, therefore, be determined with reference to the appended claims, along with the full scope of equivalents to which such claims are entitled.

We claim:

1. A method, comprising:
    storing a baseline configuration signature for a first computing device, wherein the baseline configuration signature was generated based on initial configuration data for the first computing device;
    upon initialization of the first computing device, receiving a current configuration signature from the first computing device, wherein the current configuration signature is generated based on current configuration data, wherein the initial configuration data and the current configuration data each define a communication protocol for data communications between the first computing device and a second computing device, wherein the defined communication protocols specify at least one of a plurality of data types to be transmitted, an ordering of the plurality of data types, or a size of at least one of the plurality of data types; and
    upon determining the current configuration signature and the baseline configuration signature do not match, generating, by operation of one or more computer processors, a notification indicating that data subsequently received from the first computing device is of uncertain integrity, such that the data subsequently received from the first computing device no longer complies with at least one of: the plurality of data types to be transmitted, the ordering of the plurality of data types, or the size of at least one of the plurality of data types;
    wherein a determination that the current configuration signature and the baseline configuration signature do not match occurs when the first computing device is no longer following the defined communication protocol thereof.

2. The method of claim 1, wherein the baseline configuration signature is generated by a configuration application and received from the configuration application over a data communications network.

3. The method of claim 2, wherein the configuration application is configured to generate the baseline configuration signature using initial configuration data for the first computing device and upon successful configuration of the first computing device.

4. The method of claim 3, wherein the first computing device is configured, upon initialization, to retrieve configuration data on the first computing device at the time of initialization and to generate the current configuration signature using the retrieved configuration data.

5. The method of claim 4, wherein the baseline configuration signature comprises a hash value, and wherein the configuration application is configured to use the initial configuration data as input to a predefined hash function to generate the baseline configuration signature.

6. The method of claim 5, wherein the current configuration signature comprises a second hash value, and wherein the first computing device, upon initialization, is configured to use the retrieved configuration data as input to the predefined hash function to generate the current configuration signature.

7. The method of claim 1, further comprising:
    subsequent to determining the current configuration signature and the baseline configuration signature do not match, flagging one or more data values received from the first computing device as of uncertain integrity.

8. The method of claim 4, wherein the initial configuration data and the retrieved configuration data each define a communication protocol for implicit intra-device data communications between the first computing device and the second computing device.

9. The method of claim 8, wherein the defined communication protocols specify the plurality of data types to be transmitted, the ordering of the plurality of data types, and the size of at least one of the plurality of data types.

10. A method, comprising:
upon initialization of a first computing device, generating a current configuration signature using current data values for a predefined set of configuration parameters;
receive a baseline configuration signature from a second computing device, wherein the baseline configuration signature was generated based on initial configuration data, wherein the initial configuration data and the current configuration data each define a communication protocol for communications between the first computing device and the second computing device, and wherein the defined communication protocols specify at least one of a plurality of data types to be transmitted, an ordering of the plurality of data types, or a size of at least one of the plurality of data types; and
upon determining the current configuration signature and the received baseline configuration signature do not match, generating a notification indicating that data communicated between the first computing device and the control device are of uncertain integrity, such that the data subsequently received from the first computing device no longer complies with at least one of: the plurality of data types to be transmitted, the ordering of the plurality of data types, or the size of at least one of the plurality of data types;
wherein a determination that the current configuration signature and the baseline configuration signature do not match occurs when the first computing device or the control device is no longer following the defined communication protocols thereof.

11. The method of claim 10, wherein the baseline configuration signature is generated by a configuration application.

12. The method of claim 11, wherein the configuration application is configured to generate the baseline configuration signature using initial configuration data for the first computing device and upon successful configuration of the first computing device.

13. The method of claim 12, wherein the baseline configuration signature comprises a hash value, and wherein the configuration application is configured to use the initial configuration data as input to a predefined hash function to generate the baseline configuration signature.

14. The method of claim 13, wherein the current configuration signature comprises a second hash value, and wherein the first computing device, upon initialization, is configured to use the current data values for the predefined set of configuration parameters input to the predefined hash function to generate the current configuration signature.

15. The method of claim 14, wherein the initial configuration data and the retrieved configuration data each define attributes of a respective communication protocol for an implicit communication of data between the first computing device and the second computing device.

16. The method of claim 15, wherein the defined communication protocols specify the plurality of data types to be transmitted, the ordering of the plurality of data types, and the size of at least one of the plurality of data types.

17. The method of claim 10, further comprising:
subsequent to determining the current configuration signature and the baseline configuration signature do not match, flagging one or more data values received from the control device as of uncertain integrity.

18. A system, comprising:
a first computing device, comprising:
a first one or more computer processors; and
a first non-transitory memory containing computer program code that, when executed by operation of the first one or more computer processors, performs a first operation; and
a second computing device, comprising:
a second one or more computer processors; and
a second non-transitory memory containing computer program code that, when executed by operation of the second one or more computer processors, performs a second operation;
wherein the first operation comprises:
generating a current configuration signature using current data values for a predefined set of configuration parameters; and
transmitting the current configuration signature to the second computing device over a data communications network; and
wherein the second operation comprises:
storing a baseline configuration signature for the first computing device, wherein the baseline configuration signature was generated based on initial configuration data for the first computing device;
receiving, from the first computing device, the current configuration signature, wherein the initial configuration data and the current configuration data each define a communication protocol for implicit intra-device data communications between the first computing device and the second computing device, wherein the defined communication protocols specify at least one of a plurality of data types to be transmitted, an ordering of the plurality of data types, or a size of at least one of the plurality of data; and
upon determining the current configuration signature and the baseline configuration signature do not match, generating a notification indicating that data subsequently received from the first computing device is of uncertain integrity, such that the data subsequently received from the first computing device no longer complies with at least one of: the plurality of data types to be transmitted, the ordering of the plurality of data types, or the size of at least one of the plurality of data types;
wherein a determination that the current configuration signature and the baseline configuration signature do not match occurs when the first computing device is no longer following the defined communication protocol thereof.

19. The system of claim 18, wherein the baseline configuration signature is generated by the configuration application using initial configuration data that defines an implicit intra-device data communications protocol for an implicit communication of data between the first computing device and the second computing device.

20. The system of claim 19, wherein the defined communication protocols specify the plurality of data types to be transmitted, the ordering of the plurality of data types, and the size of at least one of the plurality of data types.

\* \* \* \* \*